(12) United States Patent
Merz et al.

(10) Patent No.: US 7,636,885 B2
(45) Date of Patent: Dec. 22, 2009

(54) METHOD OF DETERMINING UNICODE VALUES CORRESPONDING TO THE TEXT IN DIGITAL DOCUMENTS

(75) Inventors: Thomas Merz, Gräfelfing (DE); Kurt Stützer, München (DE)

(73) Assignee: PDFlib GmbH, Munich (DE)

( * ) Notice: Subject to any disclaimer, the term of this patent is extended or adjusted under 35 U.S.C. 154(b) by 773 days.

(21) Appl. No.: 11/447,826

(22) Filed: Jun. 6, 2006

(65) Prior Publication Data

US 2006/0288281 A1  Dec. 21, 2006

(30) Foreign Application Priority Data

Jun. 21, 2005  (EP) ................................. 05013373

(51) Int. Cl.
*G06F 17/00* (2006.01)
(52) U.S. Cl. .................... 715/256; 715/269; 715/264; 715/276; 341/90; 341/106; 345/467
(58) Field of Classification Search ............... 715/256, 715/269, 264, 276; 341/90, 106; 345/467
See application file for complete search history.

(56) References Cited

U.S. PATENT DOCUMENTS

| | | | | |
|---|---|---|---|---|
| 5,873,111 | A  * | 2/1999 | Edberg ..................... | 715/202 |
| 6,204,782 | B1 * | 3/2001 | Gonzalez et al. ........... | 341/90 |
| 6,583,789 | B1 * | 6/2003 | Carlson et al. ............. | 345/471 |
| 7,310,769 | B1 * | 12/2007 | Dash ........................ | 715/205 |
| 2006/0170685 | A1 * | 8/2006 | Wilson Brown ............ | 345/467 |

FOREIGN PATENT DOCUMENTS

WO   WO 97/10556 A   3/1997

OTHER PUBLICATIONS

Adobe Developer, Unicode and Glyph Names, Adobe Corperation, versions 1997-2003, pp. 1.*
Martin Durst, Unicode in XML and Other Markup Languages, W3C, published 2003, Unicode Technical Report #20.*
Apple Developer, The Cmap Table, Character to Glyph Mapping Table, Last Updated 2003, pp. 1-12.*
"Make Accessible Plug-In", Online! Apr. 13, 20012, XP002348385, retrieved from Internet URL:http://www.adobe.com/support/downloads/detail.jsp? ftpID=1161, retrieved on Oct. 6, 2005.

(Continued)

*Primary Examiner*—Stephen S Hong
*Assistant Examiner*—Matthew J Ludwig
(74) *Attorney, Agent, or Firm*—Jansson Shupe & Munger Ltd.

(57) ABSTRACT

A method of determining Unicode values corresponding to the text in digital documents includes: providing a digital document containing information related to the text in the document, the information including at least one set of data selected from the group consisting of: the numerical character code comprised by a single byte value or a sequence of multiple bytes, the glyph name corresponding to the character code for simple fonts, the code-to-Unicode mapping provided by a ToUnicode CMap, and font outline data embedded in the document; obtaining the information related to the text from the document; and determining the Unicode values corresponding to a specific code of a specific font on a per-glyph basis by executing a cascade of determination steps for each code separately, the cascade being executed in a predetermined sequence using different sources of information.

13 Claims, 2 Drawing Sheets

OTHER PUBLICATIONS

Figure 1:
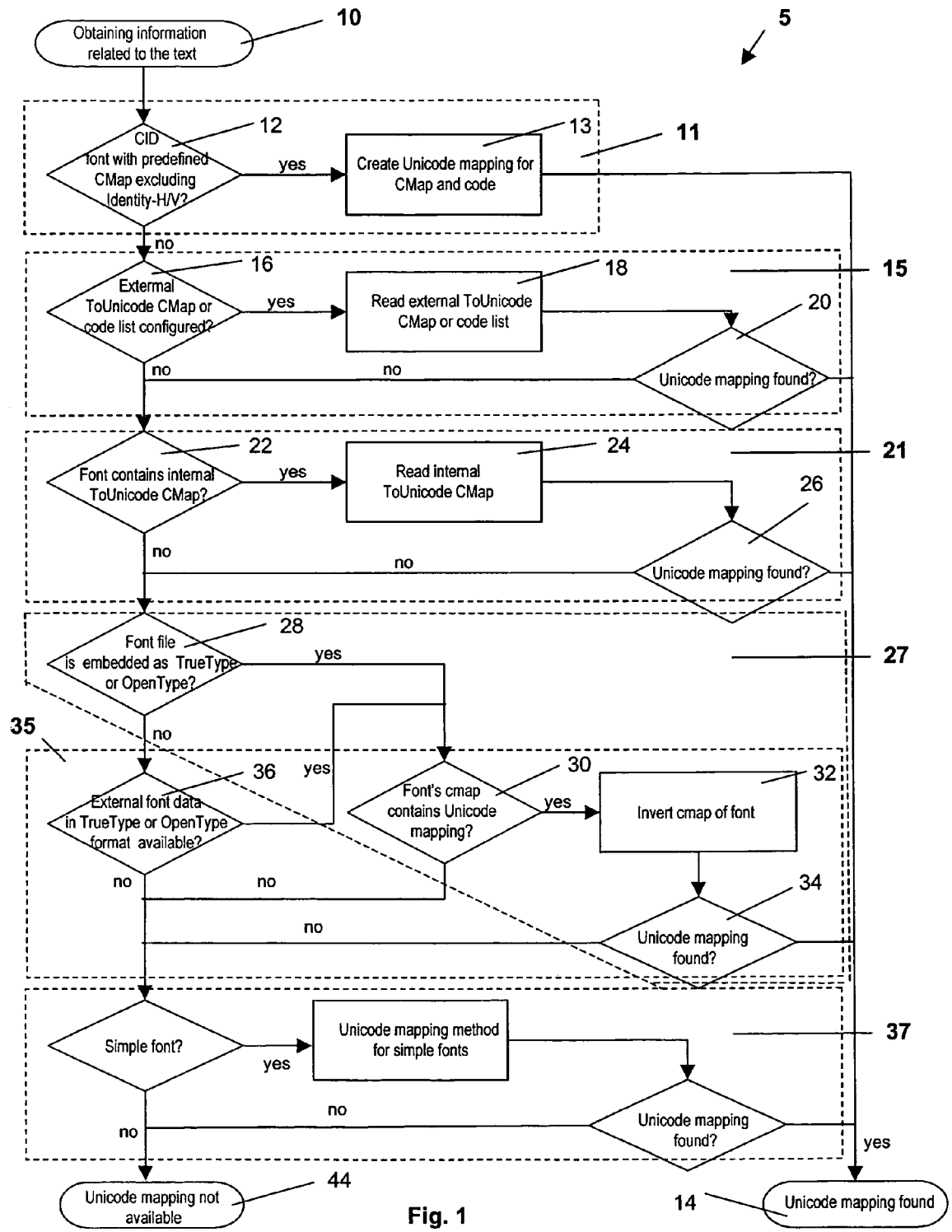

"Document Management—Electronic document file formar for long-term preservation—Part 1: Use of PDF (PDF/A)" Online! Oct. 31, 2003, XP002348386, retrieved from Internet URL:http:www.aiim.org/documents/standards/IS0_19005-1_(E).doc, retrieved on Oct. 7, 2005.

"To Unicode Mapping File Tutorial" Adobe Technical Note, Online! No. 5411, May 29, 2003, XP 002348387 San Jose, CA, US, retrieved from Internet:URL:http:acrobat/5411.ToUnicode.pdf, retrieved on Oct. 7, 2005.

* cited by examiner

METHOD OF DETERMINING UNICODE VALUES CORRESPONDING TO THE TEXT IN DIGITAL DOCUMENTS

CROSS REFERENCE TO RELATED APPLICATION

This application claims the benefit under 35 U.S.C. §119 of European application EP 05 013 373.5, filed Jun. 21, 2005.

FIELD OF THE INVENTION

The invention relates generally to a method of determining Unicode values corresponding to the text in digital documents and, more specifically, to a method of mapping text fragments, included in a document described in a page description language, to Unicode values.

BACKGROUND OF THE INVENTION

In addition to producing physical renderings of digital documents, e.g. paper prints, exchanging and archiving the digital documents themselves play an increasing role in business as well as private communications. In order to facilitate exchange and provide universal access regardless of computer system and application, general page description languages are used instead of native word processor formats for exchanging digital documents. In order to reuse the text contents of digital documents for archiving, indexing, searching, editing, and other purposes which are not related to producing a visual rendering of the page, it is desirable to convert the text using some standard character identification (encoding).

Since digital documents may contain characters from arbitrary scripts and languages in any combination, a preferred choice for such a character identification is the Unicode standard, almost identical to ISO 10646. Unicode is widely recognized as the only universal standard capable of encoding all characters which are in use world-wide. The Unicode sequence corresponding to a given text string provides the semantics of the text. Mapping the text contents of a digital document to Unicode is highly advantageous for all processes which rely on the text semantics, such as searching, editing, or converting to other formats, such as XML.

In addition, the ability of creating a semantically equivalent text version of a graphically rendered page may facilitate the accessibility of PDF (Portable Document Format) documents for physically impaired users (e.g. software for reading the text to blind users). If only a graphical representation is available, without proper semantics, other forms of usage are impossible.

The importance of preserving the semantics of a digital document by providing proper Unicode mappings for the text contained in the document is emphasized by the forthcoming ISO 19005-1 standard for PDF in Archiving, or PDF/A. PDF/A strives to define a subset of PDF which is suited for long-time preservation and archival in order to make sure that PDF documents can be used decades from now, even using software systems and applications which are completely different from those in use today. The conditions stated by PDF/A eliminate all ambiguous constructs which may thwart faithful rendition of the document in the future.

In addition, the "full conformance level" of PDF/A mandates the availability of complete and correct Unicode mapping information for all text contents. As opposed to the "minimum conformance level," which guarantees only faithful graphical representation, the full conformance level guarantees to preserve the underlying semantics of the document as well, which is a highly advantageous aspect of long-time preservation.

Digital document formats such as the PDF (Portable Document Format) use a variety of data structures for representing textual content. The use of various font formats, encoding schemes, and combinations thereof results in a variety of methods for mapping the bytes in a page description to readable text on the page. While these methods generally allow faithful visual rendition, Unicode mappings (and therefore the semantics of the text) are not always available in the digital document. In some cases Unicode mappings are provided explicitly in the PDF document, sometimes they can be derived indirectly using well-known methods, and in some cases substantial effort may be required to provide Unicode mappings.

PDF documents can use various techniques and data structures for representing text on a page. The choice of font and encoding, as well as the kind and volume of information for Unicode mapping, typically depends on the software creating the PDF. Many considerations (ease of development, project requirements, internationalization issues, scheduled may influence the font output created by a particular program for creating PDF, and therefore the degree and reliability of Unicode mappings. While in recent years the awareness of the importance of proper Unicode mappings among developers of PDF-creating software increased and subsequently more products create PDF output with reliable explicit Unicode mappings, a large number of existing ("legacy") PDF documents do not contain explicit or complete information for Unicode mapping.

In the following description the terms "character" and "glyph" are used; it is important to distinguish these concepts. "Characters" are the smallest units which convey information in a language. Common examples are the letters of the Latin alphabet, Chinese ideographs, and Japanese syllables. Characters have a meaning; they are semantic entities. The Unicode standard encodes characters. "Glyphs" are different graphical variants which represent one or more particular characters. Glyphs have an appearance; they are representational entities. Fonts are used to produce visual representations of glyphs. There is no one-to-one relationship between characters and glyphs. For example, a ligature is a single glyph which corresponds to two or more separate characters.

Certain classes of fonts are supported in PDF. For >>simple<< fonts (e.g., PostScript Type 1, TrueType, and Type 3 fonts), each glyph on the page is identified by an 8-bit value which is used to index the encoding vector, an array containing up to 256 glyph names. The glyph name in turn is used to locate the glyph outline description within the font data to draw the glyph shape. The encoding can explicitly or implicitly be specified in the PDF file. Some simple fonts don't have an explicit encoding entry with glyph names, but use a >>builtin<< encoding. The builtin encoding is part of the font outline data which may be embedded in the PDF document, or may be available from an external source such as from the operating system or from an external file.

For CID fonts, each glyph is identified by a sequence of one or more 8-bit values, where the sequences may have varying lengths. Using a mapping scheme called CMap (Character Map), these sequences are mapped to a CID value (Character ID). These CIDs can refer to predefined tables, so-called "character collections." For example, Adobe Systems Inc., the developer of PDF, makes available character collections for Chinese, Japanese, and Korean. The combination of CID (a numerical code) and a named character collection uniquely identifies the glyph. Since the character collections are well-known, Unicode mappings for all character collections can be prepared in advance, and are actually publicly made available by Adobe Systems, Inc. The availability of these mapping tables facilitates Unicode mappings for the well-known character collections and predefined CMaps. However, some CID fonts do not refer to a predefined character collection, but to some other mapping scheme which is internal to the font (e.g., Identity-H and Identity-V CMaps). CID fonts with Identity CMaps do not allow Unicode mapping using predefined tables as is the case for CID fonts with predefined CMaps.

Regardless of the font class (simple font or CID font), additional optional data structures may provide Unicode mappings for some or all of the glyphs in a font (e.g., ToUnicode CMap; not to be confused with the CMaps used for CID fonts) or some instances of text on the page (e.g., ActualText for Tagged PDF). However, such additional data structures are not necessarily present. If a ToUnicode CMap is present, the PDF-generating software usually creates it from information provided in the corresponding font outline file.

The actual font outline descriptions (descriptions of the geometric glyph shapes) may optionally be embedded in the PDF document in several formats, such as PostScript Type 1, TrueType, and OpenType. All or parts of the original font file can be embedded with or without modifications. Partial embedding (i.e., font subsets) offers space advantages since only the outline descriptions of those glyphs are embedded which are actually used in the document.

As explained above, in many cases the corresponding Unicode values for the text semantics can either be deduced from the code mapping scheme itself (e.g. standardized glyph names or codes according to a well-known code page) or some auxiliary data structure, such as the ToUnicode CMap in PDF. However, digital documents are not guaranteed to contain explicit information for creating Unicode mappings for the text in a digital document.

Therefore, the known Unicode mapping methods fail if a particular font does not have a ToUnicode CMap (or an incomplete one) and one of the following conditions is true:

It is a simple font which uses non-standard glyph names. For example, glyph names may have been created algorithmically instead of chosen by a human.

It is a simple font with builtin encoding.

It is a CID font with one of the Identity-H or Identity-V CMaps.

In these cases, the known methods do not provide any Unicode mappings.

In addition, in some situations the required data structures are present in the PDF, but correct and complete Unicode mapping is impossible nevertheless. The present inventors have determined that although the data structures for Unicode mapping are available, they may provide wrong or useless results. For example, simple fonts may use glyph names from a well-known set, but the name assignments can be wrong. Similarly, the present inventors have determined that situations exist where the PDF-generating software may have created a ToUnicode CMap which contains wrong Unicode mappings because proper Unicode information was not available at the time when the PDF was created. As an example for useless Unicode mapping data, a ToUnicode CMap may provide values in Unicode's Private Use Area (PUA) which do not have any intrinsic semantics, and are therefore unusable for general data processing and exchange. (PUA values are actually quite common since many font developers assign PUA values to some of the glyphs in their fonts.). Furthermore, the present inventors have determined that situations exist where even if the data structures for Unicode mapping are available, they may be incomplete; while Unicode mappings are available for most glyphs of a font, some glyph mappings may be missing. For example, the ToUnicode CMap is not required to cover all codes which are actually used in the document; some glyph codes may be missing from the ToUnicode CMap.

Therefore, it is an object of the present invention to provide correct Unicode mappings in more cases than the methods known in the art, especially where these methods do not produce Unicode mappings, or where these mappings are wrong or incomplete. Further, it is an object of this invention to provide a general solution for all such situations.

SUMMARY OF THE INVENTION

The present invention provides an improved method for determining Unicode values—and therefore universally usable semantics—corresponding to text fragments in PDF documents. According to an aspect of the invention, a method of determining Unicode values corresponding to the text in digital documents includes: providing a digital document containing information related to the text in the document, the information including at least one set of data selected from the group consisting of: the numerical character code comprised by a single byte value or a sequence of multiple bytes, the glyph name corresponding to the character code for simple fonts, the code-to-Unicode mapping provided by a ToUnicode CMap, and font outline data embedded in the document; obtaining the information related to the text from the document; and, determining the Unicode values corresponding to a specific code of a specific font on a per-glyph basis by executing a cascade of determination steps for each code separately, the cascade being executed in a predetermined sequence using different sources of information.

Accordingly, information which is required for Unicode mapping, but is not available in the PDF document, may be added by use of predefined tables, by methods for algorithmically deriving it from existing information, and by additional configurable tables.

BRIEF DESCRIPTION OF THE DRAWING FIGURES

Figure 2:
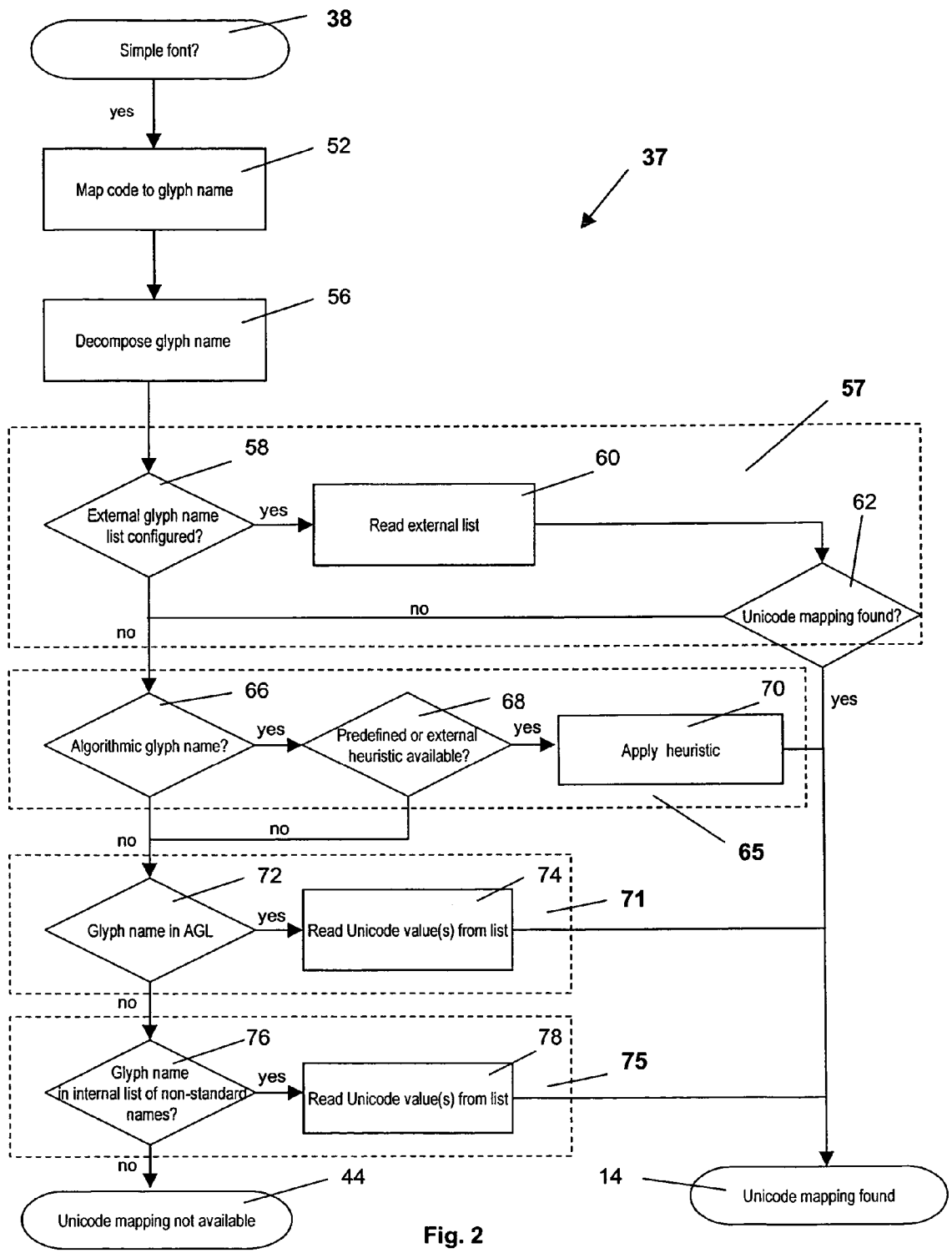

Further objects, features and advantages of the invention may become apparent from the detailed description of preferred embodiments and from the associated drawing figures, wherein:

FIG. 1 shows a flow chart representing the hierarchical cascade of determination steps of a preferred method of determining Unicode values corresponding to the text in digital documents, according to an exemplary embodiment of the invention; and FIG. 2 shows an exemplary flow chart representing a hierarchical cascade of determination steps for simple fonts (e.g., determination step 37 in FIG. 1) in more detail.

DETAILED DESCRIPTION OF PREFERRED EMBODIMENTS

The invention extends the known methods such that it provides Unicode mappings for cases which are either not covered by the standard methods, or where the standard methods provide wrong results. Instead of relying on a single source of information for creating the Unicode mapping for a character code, a cascading scheme is used. A preferred embodiment of a cascade 5 according to the invention is shown in FIGS. 1 and 2.

In each step of cascade 5, some source of information is examined in order to find the corresponding Unicode mapping for a particular code. If a mapping cannot be found, the next step in cascade 5 is performed, using another source of information.

Conceptually, cascade 5 is executed on a per-glyph basis, not on a per-font basis so that cascade 5 is performed for each code used in a font. For performance reasons, a lookup table for all codes is built once in order to avoid redundant lookups.

Executing the cascade for each code separately is an important aspect of the method since it allows to construct the Unicode mapping for a font from a combination of different sources of information. This allows filling gaps or correcting errors in data structures by subsequent steps in cascade 5. For example, while the Unicode mapping for one character of a font may adequately be described in the corresponding ToUnicode CMap, another character of the same font may require another mapping method since its mapping is missing from the font's ToUnicode CMap.

In the following, a preferred embodiment of cascade 5 of determination steps is described in more detail.

In order to determine the Unicode value for a particular glyph on the page, in step 10 the following information must first be obtained from the PDF data structures:

The numerical character code comprised by a single byte value or a sequence of multiple bytes.

For simple fonts: the glyph name corresponding to the character code.

The code-to-Unicode mapping provided by a ToUnicode CMap, if present.

Font outline data embedded in the PDF, if present, or available from some external source.

In a first determination step 11, CID fonts which use one of the predefined CMaps, for example where Chinese, Japanese, and Korean, except Identity-H and Identity-V (or a custom CMap along with one of the well-known character collections) are mapped. Since CIDs for predefined CMaps must be correct (otherwise the file could not properly be displayed or printed), this CID conversion step 11 is performed first. For this purpose, it is determined in step 12 if the font is a CID font with a predefined CMap excluding Identity-H and Identity-V. Predefined CMaps are generally referenced by name, and are available from some external source. For example, they are made available by Adobe Systems, Inc. If so, the CID font is mapped in step 13 using this predefined CMap and the corresponding Unicode mapping table so that the correct Unicode mapping is found (box 14). Subsequently, the method loops back to step 10 for the next glyph mapping to be determined.

If the determination step 12 yields that the font is not a CID font, the method proceeds to a second determination step 15. In the second determination step 15, it is determined in step 16 if an external ToUnicode CMap containing code-to-Unicode mappings or an external code list is configured (alternatively to the ToUnicode CMap, the mapping can be provided in a different syntactical format called the "code list"). If so, the external (i.e., external to the PDF document) ToUnicode CMap or code list is read in step 18, and it is determined in step 20 if the correct Unicode mapping has been found. If this is true, the method continues in step 10 for the next character to be determined.

These and further external configuration tables described in more detail below contain data which augment or replace the information found directly in the PDF document. At first glance, having configuration tables as auxiliary data structures for Unicode mapping of PDF documents may not look like an advantage since creating the tables requires some extra effort. However, due to the widespread use of PDF, large archives of PDF documents have already been built. In many cases, the same software and the same fonts have been used to create a large number of documents with similar font and encoding characteristics. For example, corporate or government archives have been built which contain large numbers of PDFs. In such a situation, it is beneficial to create configuration tables once which aid in producing the Unicode mappings for many PDF documents.

The external ToUnicode CMap is preferred to the internal ToUnicode CMap as errors and omissions in the document can be corrected this way.

If in step 16 no external to Unicode CMap or code list could be found, or if in step 20 no usable Unicode mapping could be found, the method continues with the third determination step 21. Examples for unusable mappings are PUA values and the Unicode replacement character (which is used as a placeholder for unknown characters).

In the third determination step 21, it is determined in step 22 if the font contains an internal ToUnicode CMap (i.e. a CMap which is contained in the PDF document). If so, it is used to derive the Unicode value corresponding to the code. Thus, the internal ToUnicode CMap is read in step 24 according to a known technique, and it is determined in step 26 if a usable Unicode mapping has been found. If so, the method continues in step 10 for the next character to be determined.

If in step 22 no internal ToUnicode CMap was available, or if in step 26 no correct Unicode mapping could be found, the method continues with the fourth determination step 27. In the fourth determination step 27, as an additional source of information, font outline data is examined in an attempt to find information which is missing from the PDF data structures. In step 28, it is first examined if the font file is embedded as TrueType font or OpenType font. If so, determination step 30 figures out if the cmap table of the font contains a Unicode mapping. The "cmap" is an internal data structure contained in TrueType and OpenType fonts which can provide Unicode-to-code mappings, or mappings from some other encoding scheme to font-related codes; it must not be confused with the CMaps used in the PDF format. Subsequently, the method proceeds to step 32 where the cmap of the font is inverted according to a known method. Finally, in step 34 it is determined if a usable Unicode mapping has been found.

Similarly, external font data in TrueType or OpenType format may be available. Thus, if in step 28 it is discovered that the font file is not embedded as TrueType or OpenType font, the method moves forward to the fifth determination step 35. This step 35 includes determining if external font data in TrueType or OpenType format is available. If so, the sequence proceeds to steps 30 and 32, as above.

If any of the steps 36, 30, and 34 yields a negative result, the method proceeds to the determination category 37 relating on simple fonts. This category 37 in turn consists of a cascade of several steps which are depicted in more detail in FIG. 2.

First of all, it is determined in step 38 if the font is a simple font and, if so, the code is mapped to the glyph name according to the information contained in the document in step 52. This mapping of the code to the glyph name is known in the art. Then, the glyph name is decomposed in step 56 which is also a standard procedure. Decomposition is required for the names of glyphs which represent more than one character, such as ligatures. The decomposition is applied as the inverse of the glyph name composition rules described in the document "Unicode and Glyph Names" published by Adobe Systems, Inc.

Based on this information, a cascade of Unicode mapping methods for simple fonts takes place. However the above mentioned glyph names often provide severe difficulties. Since glyph names for simple fonts represent an important case where Unicode mapping is not always possible, some examples are now provided of glyph names used in PDF documents.

Table 1 shows various examples of glyph names found in PDF documents, where "standard glyph names" are names corresponding to descriptions well-known in the art (left column). The "glyph" names may have been created algorithmically instead of chosen by a human, and each name consists of a constant prefix and a decimal or hexadecimal number. This often happens when print data streams are captured and converted to PDF. The original fonts are converted from one format to another, and the glyph names are lost in the process, or replaced with generic names (middle column). The "wrong glyph names," for example, are Latin glyph names used for a Hebrew or Arabic font because the software for creating the font did not support the appropriate Hebrew or Arabic glyph names (right column).

TABLE 1

| Standard Glyph name | Glyph | Algorithmic Glyph name | Glyph | Wrong Glyph name | Glyph |
|---|---|---|---|---|---|
| g | g | #oE | ffi | A | خ |
| udieresis | ü | char41 | A | s | ش |
| germandbls | β | G3C | < | eight | ᴧ |
| seven | 7 | K3o | 0 | | |
| ffi or f_f_i | ffi | | | | |
| Omega | Ω | | | | |
| Djecyrillic | Ђ | | | | |

The sixth determination step 57 involves determining 58 if an external glyph name list is configured and, if so, reading 60 the external list. Afterwards, it is determined in step 62 if a usable Unicode mapping has been found.

The external glyph name list again is preferred to internal glyph name lists as errors and omissions in the document can be corrected in this way.

If in step 58 no external glyph name list could be discovered, or if in step 62 no usable Unicode mapping could be found, the method continues with the seventh determination step 65. This step 65 includes the step 66 of determining if the glyph name is an algorithmically created glyph name. A glyph name is considered algorithmically created if it is constructed according to some formal rule instead of having been chosen by a human. Algorithmically created glyph names often use a common prefix for all glyphs of a font, followed by a numerical designation. If the glyph name can be determined to be an algorithmic one, in step 68 it is searched for a predefined or external heuristic which in turn is applied to the glyph name to provide a usable Unicode mapping. Heuristics can take the numerical part of a glyph name and interpret it according to some encoding scheme. The prefix, representation of the numerical part (e.g., hexadecimal or decimal, two, three, or more digits), and the corresponding encoding scheme could be provided externally.

If any of the steps 66 and 68 provide negative results, the method continues with the eighth determination step 71. In this step 71, it is determined 72 if the glyph name is contained in the AGL or constructed according to the glyph naming rules in "Unicode and Glyph Names." In this case, the method uses 74 the Adobe Glyph List to derive the corresponding Unicode values. The AGL contains Unicode mappings for many well-known glyph names; the "Unicode and Glyph Names" document contains construction rules for creating glyph names, e.g., sequences for multi-character glyphs.

Mapping glyph names for simple fonts can be improved by inverting the methods for constructing glyph names.

If in step 72 a glyph name according to AGL or "Unicode and Glyph Names" is not found, the ninth determination step 75 comes into effect. This step 75 checks if the glyph name to be mapped is contained in an internal list of non-standard glyph names which can be provided. The present inventors have developed such lists based on the results of converting schemes derived from several years of experience.

Although nine determination of mapping steps have been described in the preferred embodiment, it may be preferable to omit one or a plurality of them depending on the information contained in the document. For example, CID fonts with predefined CMaps are used for Chinese, Japanese, and Korean fonts only, and can be disregarded when only German or English text is to be mapped.

Summing up, the decision cascade 5 has been arranged according to some common principles. First of all, the data sources, i.e., information retrieved from the PDF data structure as well as information from external configuration and font files, are ordered according to their reliability. External sources for a data structure are examined before the corresponding internal data structure in order to allow overriding of incorrect information, or amending of incomplete information contained in the PDF document. Since algorithmically constructed glyph names may occasionally collide with well-known glyph names from one of the predefined lists, the former have precedence over the latter. For example, the glyph name a101 is contained in the list of well-known names, but may also be used in a font which completely uses algorithmically created glyph names, such as a100, a101, a102, etc. Similarly, an external glyph name list has precedence over the list of well-known glyph names because in some cases standard names are applied to the wrong glyphs, and must be corrected by an external glyph name list. Thus, with the present invention it is possible to determine correct Unicode mappings for an increased number of documents.

It is to be understood that the present invention can be implemented in various forms of hardware, software, firmware, special purpose processes, or a combination thereof. In one exemplary embodiment, the present invention can be implemented in software as an application program tangibly embodied on a computer readable program storage device. The application program representing the method according to the invention can be uploaded to, and executed by, a machine comprising any suitable architecture.

Given the teachings of the present invention provided herein, one of ordinary skill in the related art will be able to contemplate these and similar implementations or configurations of the present invention. For example, the method is described for documents in the Portable Document Format (PDF). However, it can be applied to other page description languages as well, such as PostScript.

What is claimed is:

1. A method of determining Unicode values corresponding to the text in digital documents, comprising:
   providing a digital document containing information related to the text in the document, the information including at least one set of data selected from the group consisting of:
   the numerical character code comprised by a single byte value or a sequence of multiple bytes, the glyph name corresponding to the character code for simple fonts, the code-to-Unicode mapping provided by a ToUnicode CMap, and font outline data embedded in the document;
   obtaining the information related to the text from the document; and determining Unicode values corresponding to a specific code of a specific font on a per-glyph basis, wherein the determination of the Unicode values is performed by executing a cascade of determination steps for each code separately, the cascade being executed in a predetermined sequence using different sources of information, and wherein the cascade of determination steps comprises at least two of the following steps:

provide one of an external ToUnicode CMap and a code list and reading the external ToUnicode CMap or code list;

determining if a font file is embedded as one of TrueType and OpenType and, if so, determining if the font's cmap contains a Unicode mapping and, if so, inverting the cmap of the font;

determining if external font data in TrueType or OpenType format is available and, if so, determining if the font's cmap contains a Unicode mapping and, if so, inverting the cmap of the font;

determining if an external glyph name list is configured and, if so, reading the external list;

determining if the glyph name is an algorithmic glyph name and, if so, determining if a predefined or external heuristic is available for this algorithm and, if so, applying the heuristic;

determining if the glyph name is contained in an internal list of non-standard names and, if so, reading the Unicode value from that list.

2. The method of determining Unicode values corresponding to the text in digital documents according to claim 1, wherein a first determination step comprises determining if the font is a CID font with a predefined Cmap other than Identity and, if so, mapping the CID font using this predefined CMap and a pre-existing auxiliary table.

3. The method of determining Unicode values corresponding to the text in digital documents according to claim 1, wherein a second determination step comprises providing one of an external ToUnicode CMap and a code list, and reading the external ToUnicode CMap or code list.

4. The method of determining Unicode values corresponding to the text in digital documents according to claim 1, wherein a third determination step comprises determining if the font contains an internal ToUnicode CMap and, if so, reading the internal ToUnicode CMap contained in the document.

5. The method of determining Unicode values corresponding to the text in digital documents according to claim 1, wherein a fourth determination step comprises determining if a font file is embedded as one of TrueType and OpenType and, if so, determining if the font's cmap contains a Unicode mapping, and if so, inverting the cmap of the font.

6. The method of determining Unicode values corresponding to the text in digital documents according to claim 1, wherein a fifth determination step comprises determining if external font data in TrueType or OpenType format is available, and if so, determining if the font's cmap contains a Unicode mapping, and if so, inverting the cmap of the font.

7. The method of determining Unicode values corresponding to the text in digital documents according to claim 1, wherein a determination category for simple fonts comprises determining if the font is a simple font and, if so, mapping the code to the glyph name according to the information contained in the document and decomposing the glyph name.

8. The method of determining Unicode values corresponding to the text in digital documents according to claim 7, wherein the determination category for simple fonts further comprises a sixth determination step including determining if an external glyph name list is configured and, if so, reading the external list.

9. The method of determining Unicode values corresponding to the text in digital documents according to claim 7, wherein the determination category for simple fonts further comprises a seventh determination step including determining if the glyph name is an algorithmic glyph name and, if so, determining if a predefined or external heuristic is available for this algorithm and, if so, applying the heuristic.

10. The method of determining Unicode values corresponding to the text in digital documents according to claim 7, wherein the determination category for simple fonts further comprises an eighth determination step including determining if the glyph name is contained in an Adobe Glyph List, and if so, reading the Unicode value from that list.

11. The method of determining Unicode values corresponding to the text in digital documents according to claim 7, wherein the determination category for simple fonts further comprises a ninth determination step including determining if the glyph name is contained in an internal list of non-standard names and, if so, reading the Unicode value from that list.

12. The method of determining Unicode values corresponding to the text in digital documents according to claim 1, wherein the predetermined sequence is performed in an order of determination steps, and wherein one or a plurality of the determination steps is omitted depending on whether text information contained in the document is relevant to text being mapped.

13. A program storage device readable by a computer, tangibly embodying a program of instructions executable by the computer to perform a determination of Unicode values corresponding to the text in digital documents, the determination including the steps of:

providing a digital document containing information related to the text in the document, the information including at least one set of data selected from the group consisting of:

the numerical character code comprised by a single byte value or a sequence of multiple bytes, the glyph name corresponding to the character code for simple fonts, the code-to-Unicode mapping provided by a ToUnicode CMap, and font outline data embedded in the document;

obtaining the information related to the text from the document; and determining Unicode values corresponding to a specific code of a specific font on a per-glyph basis, wherein the determination of the Unicode values is performed by executing a cascade of determination steps for each code separately, the cascade being executed in a predetermined sequence using different sources of information, and wherein the cascade of determination steps comprises at least two of the following steps:

providing one of an external ToUnicode CMap and a code list and reading the external ToUnicode CMap or code list;

determining if a font file is embedded as one of TrueType and OpenType and, if so, determining if the font's cmap contains a Unicode mapping and, if so, inverting the cmap of the font;

determining if external font data in TrueType or OpenType format is available and, if so, determining if the font's cmap contains a Unicode mapping and, if so, inverting the cmap of the font;

determining if an external glyph name list is configured and, if so, reading the external list;

determining if the glyph name is an algorithmic glyph name and, if so, determining if a predefined or external heuristic is available for this algorithm and, if so, applying the heuristic;

determining if the glyph name is contained in an internal list of non-standard names and, if so, reading the Unicode value from that list.

* * * * *